United States Patent
Huang

(10) Patent No.: US 10,838,103 B2
(45) Date of Patent: Nov. 17, 2020

(54) EFFECTIVE TARGET DETECTION DEPTH INFORMATION FOR METAL DETECTORS

(71) Applicant: Minelab Electronics Pty Limited, Mawson Lakes (AU)

(72) Inventor: Ruifeng Huang, Mawson Lakes (AU)

(73) Assignee: Minelab Electronics Pty. Limited, South Australia (AU)

( * ) Notice: Subject to any disclaimer, the term of this patent is extended or adjusted under 35 U.S.C. 154(b) by 167 days.

(21) Appl. No.: 16/115,972

(22) Filed: Aug. 29, 2018

(65) Prior Publication Data

US 2019/0064384 A1 Feb. 28, 2019

(30) Foreign Application Priority Data

Aug. 29, 2017 (AU) .................. 2017903479

(51) Int. Cl.
G01V 3/28 (2006.01)
G01V 3/38 (2006.01)
G01V 3/10 (2006.01)
G01V 3/165 (2006.01)
G01V 3/08 (2006.01)

(52) U.S. Cl.
CPC .............. *G01V 3/38* (2013.01); *G01V 3/081* (2013.01); *G01V 3/10* (2013.01); *G01V 3/165* (2013.01)

(58) Field of Classification Search
CPC .......... G01V 3/081; G01V 3/10; G01V 3/165; G01V 3/38; G01V 11/007; G01V 2210/6163; G01V 3/08; G01V 3/082; G01V 3/12; G01V 3/16; G01V 3/40; F41H 11/136; G06K 9/6263; G06K 9/62; G06F 11/30; G01R 33/032; G01R 1/24; G01R 27/02; G01R 33/0017; G01R 33/02; G01R 33/0354; G01R 33/07; G01R 33/1284; G01R 33/24; G01R 33/26; G01R 33/323; G01R 33/34; G01R 33/60

See application file for complete search history.

(56) References Cited

U.S. PATENT DOCUMENTS 4,837,514 A * 6/1989 Spies ....................... G01V 3/38
324/336
6,967,574 B1 11/2005 Nelson
7,310,060 B2 * 12/2007 Stilwell ................. G01S 13/888
324/326

(Continued)

OTHER PUBLICATIONS

Bruschini, "A Multidisciplinary Analysis of Frequency Domain Metal Detectors for Humanitarian Demining", Ph.D. Thesis, Sep. 2002, Vrije Universiteit Brussel.

*Primary Examiner* — Vinh P Nguyen
(74) *Attorney, Agent, or Firm* — The Webb Law Firm

(57) ABSTRACT

A method for detecting an electrically conductive target in soil using a metal detector including the steps of: generating a transmit magnetic field for transmission into the soil based on the transmit signal; receiving a receive magnetic field; providing a receive signal induced by the receive magnetic field; determining a noise in the receive signal or a signal to noise ratio of the receive signal; and estimating, based on either the noise in the receive signal, or the signal to noise ratio of the received signal, or both, at least one effective detection depth of one or more types of electrically conductive targets in the soil.

10 Claims, 5 Drawing Sheets

(56) References Cited

U.S. PATENT DOCUMENTS

| | | | | |
|---|---|---|---|---|
| 8,854,043 B2* | 10/2014 | Candy | ............ | G01V 3/10 |
| | | | | 324/326 |
| 9,366,779 B2* | 6/2016 | Wahrlich | ............ | G01V 3/10 |
| 10,078,148 B2* | 9/2018 | Candy | ............ | G01V 3/10 |
| 10,151,850 B2* | 12/2018 | Branson | ............ | G01V 3/10 |
| 2006/0284758 A1 | 12/2006 | Stilwell et al. | | |

* cited by examiner

EFFECTIVE TARGET DETECTION DEPTH INFORMATION FOR METAL DETECTORS

CROSS-REFERENCE TO RELATED APPLICATION

This application claims priority to Australian Patent Application No. 2017903479 filed Aug. 29, 2017, the disclosure of which is hereby incorporated in its entirety by reference.

TECHNICAL FIELD

The present invention relates to a signal processing technique of a metal detector.

BACKGROUND

The general forms of most metal detectors which interrogate soil are either hand held battery operated units, conveyor mounted units, or vehicle mounted units. Examples of hand held products include detectors used to locate gold, explosive land mines or ordnance, coins and treasure. Examples of conveyor mounted units include fine gold detectors in ore mining operations, and an example of a vehicle mounted unit includes a unit to locate buried land mines.

These metal detectors usually, but not necessarily, consist of transmit electronics generating a repeating transmit signal cycle of a fundamental period, which is applied to an inductor, for example a transmit coil, which transmits a resulting varying magnetic field, sometimes referred to as a transmit magnetic field.

These metal detectors may also contain receive electronics that process a receive signal from a measured receive magnetic field, during one or more receive periods during the repeating transmit signal cycle, to produce an indicator output signal, the indicator output signal at least indicating the presence of at least a metal target within the influence of the transmit magnetic field.

During the processing of the receive signal, the receive signal is either sampled, or synchronously demodulated, to produce one or more target channels, the one or more target channels being further processed to produce the indicator output signal.

Time domain metal detectors typically include pulse-induction (PI) or pulse-induction like metal detectors, and rectangular pulse metal detectors, wherein the receive processing includes either sampling of the receive signal or synchronous demodulation over selected periods, which may include gain weighting.

Frequency domain metal detectors typically include single or multi-frequency transmission, or pulse transmission with either sine-wave weighted synchronous demodulation, or unweighted synchronous demodulation with pre synchronous demodulation band-pass and/or low-pass filtering.

Metal detectors may include many ground balance (GB) timing settings, coil settings and other settings for the users. The users attempt to find the best configuration of the metal detector settings and judge the correctness of their choice by the noise they are listening to. This may result in the wrong choices of settings and thus the poor performance of the detector and the resultant unsatisfactory user experience.

Embodiments described herein offer alternatives to assist a user of a metal detector to select settings.

SUMMARY

According to a first aspect, there is provided a method for detecting an electrically conductive target in soil using a metal detector including the steps of: generating a transmit magnetic field for transmission into the soil based on the transmit signal; receiving a receive magnetic field; providing a receive signal induced by the receive magnetic field; determining a noise in the receive signal or a signal to noise ratio of the receive signal; and estimating, based on either the noise in the receive signal, or the signal to noise ratio of the received signal, or both, at least one effective detection depth of one or more types of electrically conductive targets in the soil.

In one form, the effective detection depth is estimated when settings of the detector are changed from a first state to a second state, such that an increase of the effective detection depth indicates to a user of the metal detector that the second state is better than the first state, and that a decrease of the effective detection depth indicates to the user of the metal detector that the first state is better than the second state.

In one form, the method further includes the step of selecting one or more types of electrically conductive targets; wherein the estimated effective detection depth is further based on the selected one or more types of electrically conductive targets. In one form, the at least one effective detection depth includes multiple effective detection depths for a range of targets.

According to a second aspect, there is provided a metal detector for detecting an electrically conductive target in soil, including: a transmitter for generating a transmit magnetic field for transmission into the soil based on the transmit signal; a receiver for receiving a receive magnetic field and for providing a receive signal induced by the receive magnetic field; and a processor for determining a noise in the receive signal or a signal to noise ratio of the receive signal; and for estimating, based on either the noise in the receive signal, or the signal to noise ratio of the received signal, or both, at least one effective detection depth of one or more types of electrically conductive targets in the soil.

In one form, the metal detector further includes a display to present the effective detection depth to the user.

In one form, the effective detection depth is estimated when settings of the detector are changed from a first state to a second state, such that an increase of the effective detection depth indicates to the user of the metal detector that the second state is better than the first state, and that a decrease of the effective detection depth indicates to the user of the metal detector that the first state is better than the second state.

In one form, the metal detector further includes an input for a user to select one or more types of electrically conductive targets; wherein the estimated effective detection depth is further based on the selected one or more types of electrically conductive targets. In one form, the at least one effective detection depth includes multiple effective detection depths for a range of targets.

According to a third aspect, there is provided a non-transitory computer readable medium including instructions to perform the method of the first aspect.

BRIEF DESCRIPTION OF DRAWINGS

Embodiments of the present invention will be discussed with reference to the accompanying drawings wherein.

DESCRIPTION OF EMBODIMENTS

Figure 1:
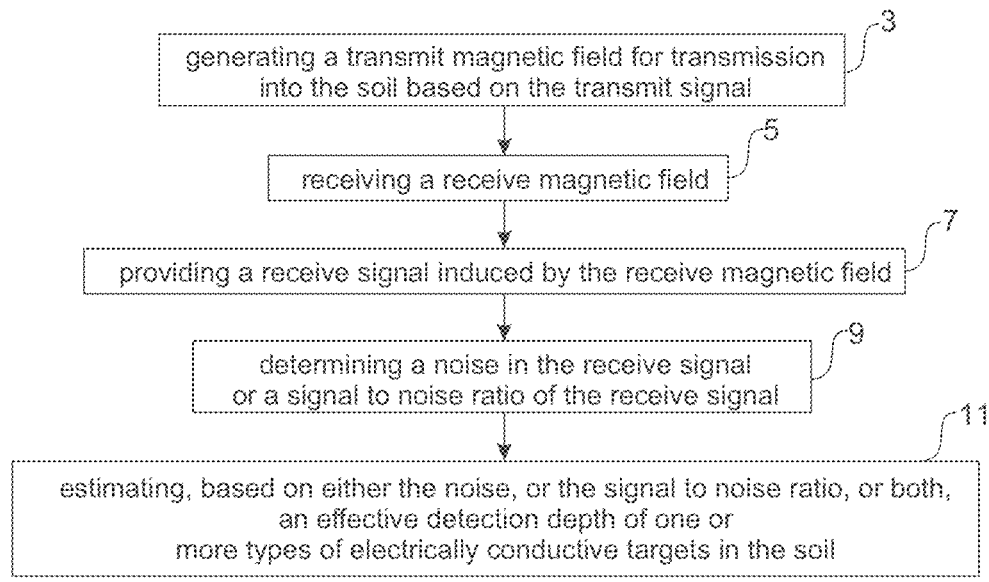
FIG. 1 depicts one embodiment to estimate the signal to noise ratio and an effective detection depth of a selected one or more target types.

In this specification, the term "component" is used to refer to a part of a larger whole. When referring to a signal, a component of a signal refers to a part of a signal, and a superposition of all components of a signal, forms the signal.

In this specification, the term "timings" is used to refer to the analogue and/or digital signal processing functions which process receive signals to reduce or remove the unwanted noise and output the target detection signal driving the audio to alert the users when there are targets present. The "timings" may be applied to a demodulated receive signal. "Timings" may also be applied to a raw receive signal, for example, when applied to a time domain detector. Sometimes, applying timings may be part of a demodulation process, during which "timings" may be known as demodulation functions or synchronous demodulation functions. In a broad sense, "timings" are functions to extract information from receive signals.

In this specification, the term "targets" is used to refer to intended objects to be found. For example, a target may be a gold nugget, a coin, a ring, a landmine, an Improvised Explosive Device (IED), depending on the application of the metal detector.

In this specification, the term "noise" is used to refer to the unwanted signal. A noise may be a signal component originating from the soil when the soil is within the influence of a transmit signal of a metal detector. A noise may also be an electromagnetic background signal (sometimes known as electromagnetic interference or EMI), for example, a noise due to a transmission line. The term "signal to noise ratio" or "SNR" is used to refer to the ratio of the strength level of the signal from the target(s) of interest to the strength level of the noise (unwanted signal).

In this specification, the term "channel" is used to refer to a processed signal, value(s) or a vector of values representing part or whole of the processed signal, depending on application and the type of channel required. A channel is obtained by processing a receive signal through sampling or demodulation, for example. Often, a channel is obtained for a specific purpose. For example, a detection/target channel is designed so that the channel contains information about a desired target(s); a ground channel is designed so that the channel contains information about the ground.

In this specification, the term "effective detection depth" is used to refer to an indicator for the estimated most likely maximum detection depth of a target. For example, if the estimated most likely maximum detection depth of a target (say a 20-cent coin) is computed to be 500 mm below the surface, then the user may be relatively certain that the detector being used may detect a 20-cent coin up to 500 mm below the surface. The "effective detection depth" is a function of settings, which may or may not include selected target types. As the settings are being changed, the "effective detection depth" would change to indicate to a user whether the changes to settings are beneficial or otherwise.

In this specification, the term "settings" is used to refer to the parameters of a metal detector, which can be accessed and controlled by the users. For example, settings of a detector may be controlled by a user to change a sought after target type (coins, nuggets, ring etc.). Settings may also be changed to affect the sensitivity of a detector to one or more types of wanted or unwanted signals. Settings are very useful in practice as they allow a user to react to certain conditions (electromagnetic interference, ground types etc.), to optimise the performance of a metal detector. However, the converse is also true. If settings are not optimised, the metal detector would perform poorly. As the conditions during metal detection change, and also due to the fact that it is not easy to know what soil type a soil is, and when the soil changes to another type, correctly selecting and optimising the settings is challenging.

Incorrect selection of settings may be due to:
a. Confusing soil types: although some advanced metal detector provides timing selection guidance based on what targets the user is after and the soil type which the detector is operating on, the user generally cannot readily identify the soil type. As a result, the users normally judge the correctness of the timing selection by listening to the ground noise only, and could lead to the wrong decision.
b. Many timings to be selected: a particular timing may only be sensitive to a particular range of targets. Depending on the number of selectable timings of a detector, the learning curve for understanding which timing is suitable for looking for targets of interest may be steep.
c. Misleading low ground noise: lower ground noise does not necessarily mean the signal to noise ratio is higher. For example, log-linear timings, as introduced in U.S. Pat. No. 8,106,770, generally produce lower ground noise than log-uniform timings. However, for moderate soils (moderate in the sense that the soil creates a moderate amount of noise signal as compared to a severe soil), log-uniform timings will have higher signal to noise ratio and thus larger detection depth than log-linear timings.
d. Different coil types: in many cases, larger coils have larger detection depth than smaller coils. However, that is not always true. For example, if the user is after very small nuggets, a small coil could have larger detection depth than a large coil. In those cases, the user could use the wrong coil.
e. Effect of severe soils: for some severe soils, for example conductive soil or saline soil, it could be impossible to find a particular range of targets, such as small nuggets for example, no matter what setting is selected.
f. Expert settings: there are some setting options such as recovery speed and filter cutoff frequency which are difficult for the user to understand and difficult for the user to select the correct trade-off between different options to gain the largest detection depth.

Embodiments described herein offer a way of helping the user to make the correct timing, coil and other option selections based on which targets the user has specified in an intuitive way, and to show to the user what detection depth may be expected for the targets the user has specified, for the current soil the detector is operating on and for the detector settings the user selects. In one embodiment, the effective detection depth changes as a user changes settings so to indicate to the user whether the changes to settings are beneficial or otherwise.

In one embodiment, steps are provided to process a receive signal, then provide to the user an effective detection depth of one or more target types. In particular, the steps include a technique to evaluate and display the effective detection depth for a metal detector to the user. The evaluation may be partly based on signal to noise ratio, and the target types selected by a user of the metal detector. Furthermore, the steps include the steps of determining the detection threshold based on the users' setting or the noise level from the detection channel/channels when there is no target present. Based on the magnetic field coupling model between the targets and the coil, the signal strength of a range of targets which the users are interested in for the coil/coils the user is using is calculated, for the timing/timings and the other detector settings which the user is using. Then, the effective detection depth is calculated based on the noise level and the signal strength. Finally, the effective detection depth for the range of targets is displayed to the user. The signal to noise ratio can also be presented at the same time.

In one embodiment as depicted in FIG. 1, there is provided a method for detecting an electrically conductive target in soil using a metal detector. The first step is to perform the step of generating a transmit magnetic field for transmission into the soil based on the transmit signal 3. The transmit magnetic field may be based on a continuous sine wave, a pulse, or a wave representing multi-frequency etc., fed into a transmitter such as a transmit coil. The transmit magnetic field will influence a target within its influence zone such that eddy currents will be induced in the target. The eddy currents in turn generate a receive magnetic field. A receiver such as a receive coil is used to perform the step of receiving a receive magnetic field 5. The receive coil upon receiving a receive magnetic field provides the step of providing a receive signal induced by the receive magnetic field 7. The receive signal is then communicated to a processor for the step of determining a noise in the receive signal or a signal to noise ratio of the receive signal 9. The processor may also process the signal in other ways to assist the detection of a target. Once step 9 is performed, it is followed by the step 11 of estimating, based on either the noise, or the signal to noise ratio, or both, an effective detection depth of one or more types of electrically conductive targets in the soil.

In one embodiment, the step further includes selecting one or more types of electrically conductive targets. The types may be coins, a particular type of coin, treasure items such as rings, gold nuggets, landmines, a particular type of landmine, TED etc. For this case, the effective detection depth is further based on the selected one or more types of electrically conductive targets. In one embodiment, there can be multiple effective detection depths for a range of targets. For example, in a single or multiple displays, effective detection depths for rings, and coins are shown to a user or operator at the same time. More often than not, the effective detection depths for different targets would be different.

In one embodiment, the effective detection depth is estimated when settings of the detector are changed from a first state to a second state, such that an increase of the effective detection depth indicates to a user of the metal detector that the second state is better than the first state, and that a decrease of the effective detection depth indicates to a user of the metal detector that the first state is better than the second state. The term "state" is used to refer to all the settings of a metal detector. In other words, the effective detection depth is updated and presented to a user whenever any of the settings of the detector is changed.

Further elaborations are provided with respect to a continuous wave (CW) metal detection system as an example to present how a metal detection system is modelled. Note that since a Pulse Induction (PI) metal detection system may be analysed in the frequency domain by using Fourier transforms without loss of generality, what is described here may be applied to a PI detection system or any other system.

Figure 2:
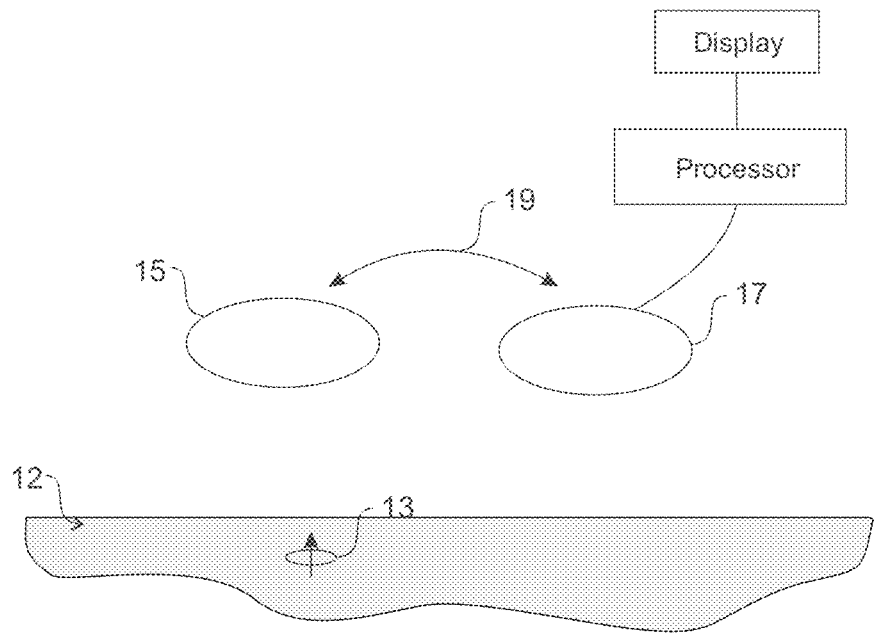
FIG. 2 shows an exemplary metal detection system.

A metal detection system may be illustrated in FIG. 2. In particular, it shows a schematic of a generic metal detector (transmit coil as 15 and receive coil as 17), over a target 13 with polarizability $\overline{M}$ buried in the soil 12. In particular, a transmit signal $V_{TX}$ with a certain amplitude is applied to the transmit coil 15. There is a current sensing transformer (not shown) which provides a reference voltage $V_{REF}$, which is proportional to the transmit current $I_{TX}$ in the transmit coil 15, and may be expressed as:

$$V_{REF}(f) = j2\pi f M_{REF} I_{TX}(f), \quad (1)$$

where f is the transmitting frequency and $M_{REF}$ is the mutual inductance of the current sensing transformer. A metal detector may transmit multiple frequencies simultaneously. Of course, these transmit coil 15 and receive coil 17 are merely examples. They may be replaced by any magnetic field transmitter and receiver. Depending on the system, a single antenna such as a coil may act as both the transmitter and receiver.

The transmit coil 15 generates a transmit magnetic field for transmission into the soil 12 based on the transmit signal. The receive coil 17 provides a receive signal $V_{RX}$ induced by the receive magnetic field. $M_{TX,RX}$ 19 is the mutual inductance between the transmit coil 15 and the receive coil 17 when both coils are placed far away from any soil or targets. In the analysis which follows, for simplicity, it is assumed that the transmit coil 15 and the receive coil 17 are substantially nulled. In other words, it is assumed that $M_{TX,RX}$ 19 is zero. Furthermore, it is assumed that that the system is linear.

In the analysis which follows, the mutual coupling effect between the soil and the target is ignored. In other words, $V_{RX}$ may be simply taken as the superposition of the response signal due to the target alone ($V_{target}$) and the response signal due to the soil alone ($V_{soil}$). Mathematically, $V_{RX}$ may be written as:

$$V_{RX} = V_{target} V_{soil}. \quad (2)$$

The raw signal ($S_{raw}$) is defined as the function of $V_{RX}/V_{REF}$ which may be expressed as:

$$S_{raw}(f) = S_{raw}^{RE}(f) + jS_{raw}^{IM}(f) = \frac{V_{RX}}{V_{REF}}, \quad (3)$$

where $S_{raw}^{RE}$ and $S_{raw}^{IM}$ are the real part and the imaginary part of $S_{raw}$, respectively.

Based on (2) and (3), the raw signal may be decomposed into the raw target signal ($T_{raw}$) and the raw soil signal ($G_{raw}$) as:

$$S_{raw}(f) = \frac{V_{target}}{V_{REF}} + \frac{V_{soil}}{V_{REF}} = T_{raw} + G_{raw}. \quad (4)$$

The raw target signal may be expressed as:

$$T_{raw}(f) = T_{raw}^{RE}(f) + jT_{raw}^{IM}(f) = -\frac{1}{\mu_0 M_{REF} I_t^2} B^t \cdot \overline{\overline{M}}(f) \cdot B^r, \quad (5)$$

where $T_{raw}^{RE}$ and $T_{raw}^{IM}$ are the real part and the imaginary part of $T_{raw}$, respectively, $\mu_0$ is the magnetic permeability of air, $B^t$ and $B^r$ are the magnetic fields produced by the transmit coil and receive coil, respectively, when no secondary sources are present and a current of $I_t$ is driven through each, and $\overline{\overline{M}}$ is the polarizability of the target, which is transmit frequency dependent.

For a metal detector transmitting and receiving N frequencies simultaneously, the raw detection signal ($DS_{raw}$) of a particular timing may take the form of the linear or non-linear combination of the real parts and the imaginary parts of the raw signal at different transmit frequencies, which may be written as:

$$DS_{raw} = F(S_{raw}^{RE}(f_1), S_{raw}^{IM}(f_1), S_{raw}^{RE}(f_2), S_{raw}^{IM}(f_2), \ldots, S_{raw}^{RE}(f_N), S_{raw}^{IM}(f_N)), \quad (6)$$

where F is the combination function which are generally designed to reject the soil effect. The raw detection signal may be further filtered to improve the signal to noise ratio. The output of the filter is named the processed detection signal (DS), which may be used to drive the audio speaker to alert the user when a target is detected. The process may be expressed as:

$$DS(f) = \text{Filter}(DS_{raw}(f)). \quad (7)$$

The raw target sensitivity ($TS_{raw}$) is defined as the raw detection signal with the soil effect removed, which may be written as:

$$TS_{raw} = F(T_{raw}^{RE}(f_1), T_{raw}^{IM}(f_1), T_{raw}^{RE}(f_2), T_{raw}^{IM}(f_2), \ldots, T_{raw}^{RE}(f_N), T_{raw}^{IM}(f_N)), \quad (8)$$

The processed target sensitivity (TS) is the filtered raw target signal, which is written as:

$$TS(f) = \text{Filter}(TS_{raw}(f)). \quad (9)$$

A metal detector may have multiple detection channels running at the same time. Each detection channel may have a different combination function, be sensitive to different targets and/or reject the soil effect differently. For example, as introduced in U.S. Pat. No. 8,106,770, a combination function may be designed to reject log-linear frequency-dependent resistive signal components and log-uniform frequency-dependent resistive signal components from the soil. As another example, as introduced in AU 2011200516 B2, a combination function may be designed to reject signal components from saline (conductive) soil.

For this example, it will be assumed that a CW metal detector transmits and receives simultaneously on two frequencies, $f_1$ and $f_2$. This detector has three channels of detection signal running at the same time. The three detection channels are designed as:

$$DS_{raw,1} = |S_{raw}^{IM}(f_1)|, \quad (10\text{-}1)$$

$$DS_{raw,2} = |S_{raw}^{IM}(f_2)|, \quad (10\text{-}2)$$

$$DS_{raw,3} = |S_{raw}^{IM}(f_1) - S_{raw}^{IM}(f_2)|, \quad (10\text{-}3)$$

$DS_{raw,1}$ and $DS_{raw,2}$ are the current art detection channels for single frequency CW metal detectors. $DS_{raw,3}$ is designed to be relatively insensitive to log-uniform magnetic (non-electrically conducting) ground. This is achieved by directly subtracting resistive channels of equal gain.

The raw target sensitivity of the three detection channels of the above example is then written as:

$$TS_{raw,1} = |T_{raw}^{IM}(f_1)|, \quad (11\text{-}1)$$

$$TS_{raw,2} = |T_{raw}^{IM}(f_2)|, \quad (11\text{-}2)$$

$$TS_{raw,3} = |T_{raw}^{IM}(f_1) - T_{raw}^{IM}(f_2)|, \quad (11\text{-}3)$$

The following presents exemplary modelling of targets. As shown in (5), in order to solve the target signal, we need to know the polarizability of conductive targets. The polarizability of conductive targets may be expressed as the following general form:

$$\overline{\overline{M}}(\omega) = \overline{\overline{C}}_0 - \Sigma_m \overline{\overline{C}}_m \left( \frac{jf/\zeta_m}{1 + jf/\zeta_m} \right), \quad (12)$$

where $\zeta_m$ is the relaxation frequency and $\overline{\overline{C}}_m$ is a real positive semidefinite, dyadic. The first term is due to the bulk magnetic susceptibility of the target and the second term is due to the currents induced in the target. This representation is valid for most discrete metal objects. $\overline{\overline{C}}_0$, $\overline{\overline{C}}_m$ and $\zeta_m$ may be determined through measurement for the targets of interest.

It will be assumed that the polarizability of the targets of interest is expressed as:

$$\overline{\overline{M}}(\omega) = -\overline{\overline{zz}} C \left( \frac{j\frac{f}{\zeta}}{1 + \frac{jf}{\zeta}} \right) = -\overline{\overline{zz}} C \left( \frac{f^2}{f^2 + \zeta^2} + j\frac{f\zeta}{f^2 + \zeta^2} \right), \quad (13)$$

where C and $\zeta$ are constant. In reality, the polarizability of rings and coins with the normal pointing toward the z direction would be very closely approximated by the above formula.

By substituting (13) into (5), we can obtain the raw target sensitivity as:

$$T_{raw}(f) = \frac{C}{\mu_0 M_{REF} I_t^2} B^t \cdot \overline{\overline{zz}} \cdot B^r \left( \frac{f^2}{f^2 + \zeta^2} + j\frac{f\zeta}{f^2 + \zeta^2} \right) = K_g R_t, \quad (14\text{-}1)$$

where $$K_g = \frac{1}{\mu_0 M_{REF} I_t^2} B^t \cdot \overline{\overline{zz}} \cdot B^r, \quad (14\text{-}2)$$

$$R_t = C\left(\frac{f^2}{f^2+\zeta^2} + j\frac{f\zeta}{f^2+\zeta^2}\right). \quad (14\text{-}3)$$

In (14), the variable $K_g$ is real and a function of the geometry, the number of turns and the orientation of both TX and RX, and the position and the orientation of the target. Thus, for a given metal detector and given position and orientation of the target and the coils, $K_g$ is a constant. It is clear that $K_g$ is independent on either the transmitting frequency or the relaxation frequency of the target.

In (14), the variable $R_t$ is complex and dependent on both the transmitting frequency and the relaxation frequency of the target.

The following presents exemplary display of SNR. It is clear from the above analysis that, from the geometry and the number of turns of both TX and RX, the $B^t$ term and the $B^r$ term in (5) may be determined using the Biot-Savart law. By substituting the polarizability ($\overline{M}$) of the target of interest into (5), the raw target signal for different transmit frequencies may be obtained, and then the raw target sensitivity, for any target position in the 3D space.

It will be assumed that the raw detection signal is designed as in (10) and the targets of interest have the polarizability expressed in (13). The raw target sensitivity of the three detection channels may then be written as:

$$TS_{raw,1} = |K_g|\frac{f_1\zeta}{f_1^2+\zeta^2}, \quad (15\text{-}1)$$

$$TS_{raw,2} = |K_g|\frac{f_2\zeta}{f_2^2+\zeta^2}, \quad (15\text{-}2)$$

$$TS_{raw,3} = |K_g|\times\left|\frac{f_1\zeta}{f_1^2+\zeta^2} - \frac{f_2\zeta}{f_2^2+\zeta^2}\right|, \quad (15\text{-}3)$$

Figure 3:
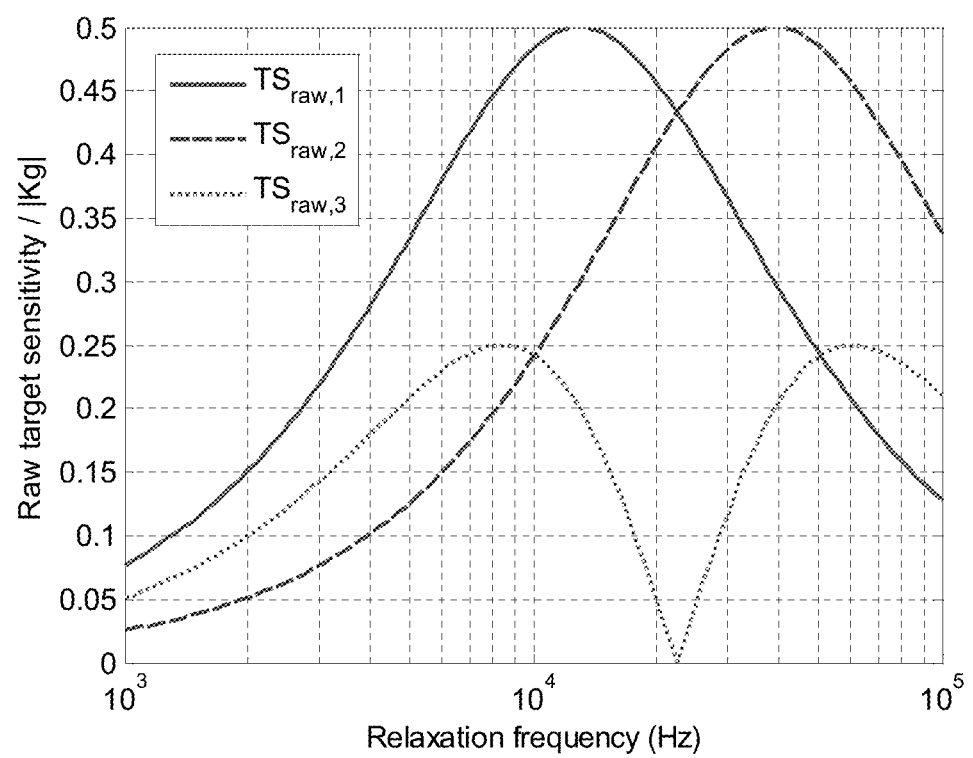
FIG. 3 shows raw target sensitivity of a CW metal detector.

FIG. 3 shows the raw target sensitivity of a CW metal detector transmitting and receiving at 13 kHz and 39 kHz simultaneously. The y axis is normalized to $|K_g|$.

The noise levels of the processed detection channels are monitored during a certain period when there is no target present. For example, the experimental noise levels of the processed detection channels for two different types of soil are listed in Table 1. Generally speaking, the noise of the processed detection channels could be due to different types of noise sources, including electronic noise in the electronic circuits, ground noise and environmental electromagnetic interference (EMI) noise. Ground noise is the false signalling caused by a detection channel that is not perfectly ground balanced to the soil. The ground noise could occur when the soil varies in mineralisation, conductivity or has dips and holes. The environmental EMI noise comes from power lines, underground cables, radar, other detectors or climatic conditions like thunder storms that produce electrical signals or noise that can interfere with a metal detector's operation. The effect of the environmental EMI noise can be reduced by shifting a metal detector's operating frequency or frequencies.

TABLE 1 noise level of the processed detection channels for different soil types

| Soil Type | $DS_1$ | $DS_2$ | $DS_3$ |
|---|---|---|---|
| Dry Sand | 3.4 | 5.9 | 6.9 |
| Mineralized Soil | 219.3 | 220.9 | 15.1 |

The raw target sensitivity normalized to the noise level of a processed detection channel may be used as the SNR of the detection channel. The SNR of the detection channels as in (8) are plotted in FIGS. 4 and 5. The SNR may be further processed by using a monotonic function or simply by scaling. The unprocessed and/or processed SNR may be displayed to the user.

Figure 4:
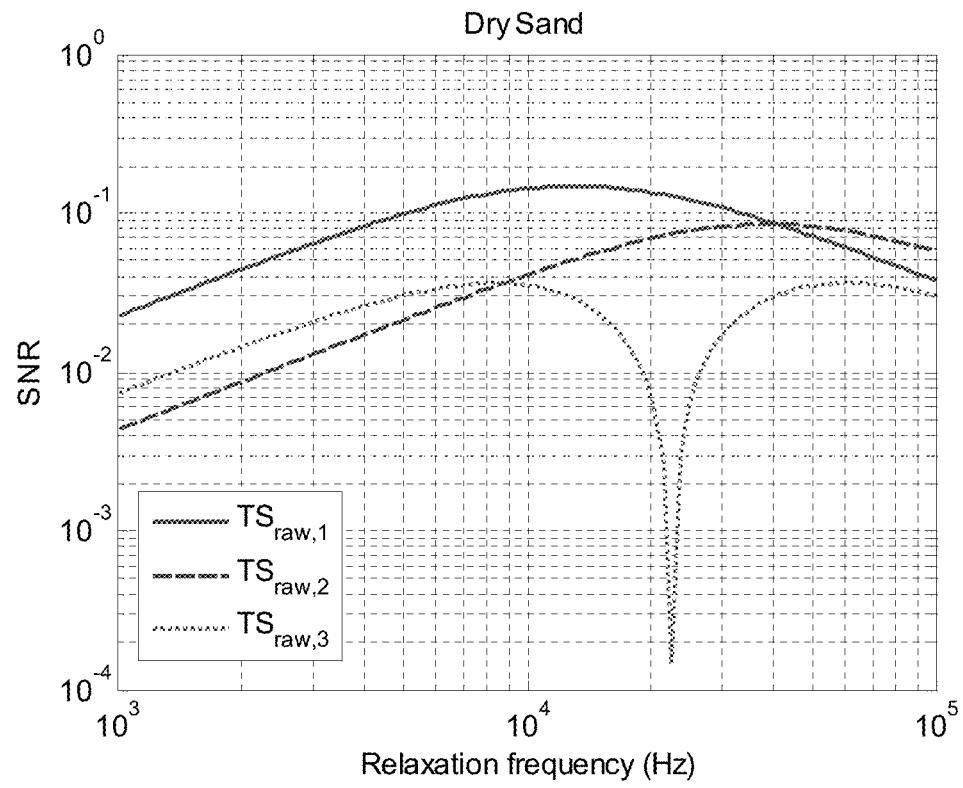
FIGS. 4 and 5 shows SNR of detection channels.
Figure 5:
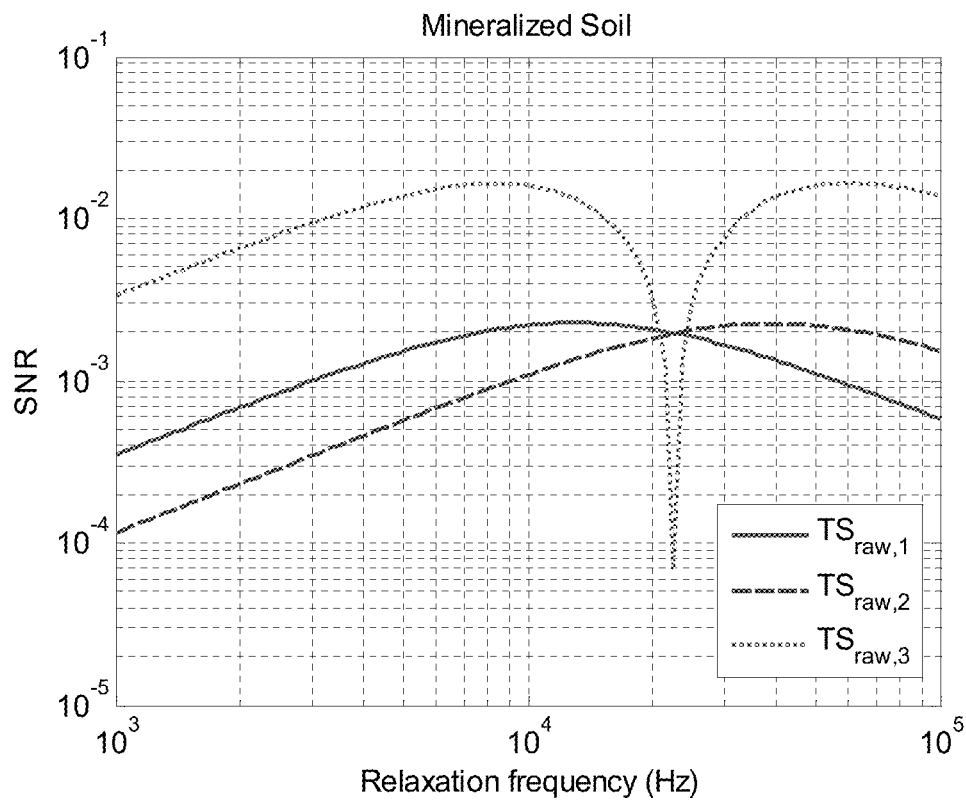

In FIGS. 4 and 5, the x axis may be changed from target frequencies to other target identification numbers, or target names, or target sizes, for the users' ease of understanding.

From FIGS. 4 and 5, it is clear that the best detection channel for certain targets of interest may be different for different types of soil. For example, for dry sand, $DS_1$ should be used if the user is after targets with relaxation frequencies below 40 kHz which covers relaxation frequencies of most of the coins. If the user is searching for very high frequency targets, such as very thin gold jewellery, $DS_2$ should be used. For the mineralized soil, generally $DS_3$ should be used. Thus, based the SNR as in FIGS. 4 and 5 or the SNR displayed on the screen of the metal detector in real time, the user may easily select the correct detection channel in different operation environment for his/her targets of interest. In many cases, the user has some prior knowledge about what types of target are most likely to be found in a particular location. For example, the user may know that a particular location has been fully searched by either himself/herself or others using some metal detectors which are good to find targets with low relaxation frequencies. Then he/she is confident that targets with high relaxation frequencies are most likely at this particular location. Based on the SNR as in FIGS. 4 and 5 or SNR indicators displayed on the screen of the metal detector in real time, the user can fully make use of his/her prior knowledge of the target distribution at the location and makes the right choice of the metal detector settings.

The SNR may also be defined as the processed target sensitivity normalized to the noise level of a processed detection channel. As mentioned above, the processed signal is the filtered raw signal. Thus, when the SNR is defined as the processed target sensitivity normalized to the noise level of a processed detection channel, the effect of different analog and/or digital filters is taken into account. The performance of different analog and/or digital filter options can be evaluated and compared. Furthermore, although it is explained above how to calculate the raw target signal and the processed target signal, both the raw target sensitivity and the processed target sensitivity may also be obtained by measurement for any targets of interest.

SNR is also useful to evaluate and compare the performance of different coils, when both the target signal ratio for the target depths of interest and the noise ratio for the soils of interest are determined between different coils by either measurement or simulation. Typical coil configurations include, but not limit to, DD coils, concentric coils, mono-loop coils, Figure-8 coils, and super-D coils.

Figure 6:
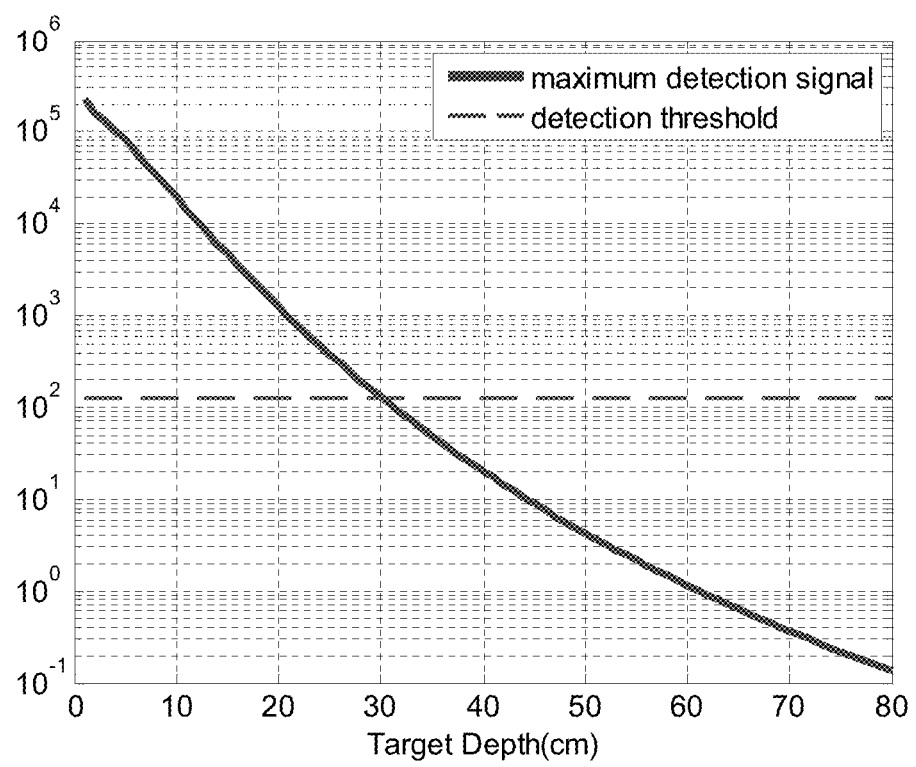
FIG. 6 shows the maximum processed detection signal of a detection channel for a target of interest buried at different depths.

In relation to the effective detection depth display, as mentioned above, the processed target sensitivity for all the detection channels may be obtained by either calculation or measurement for any target position in the 3D space for any targets of interest. An example of the maximum processed detection signal of a detection channel for a target of interest buried at different depths from a given coil is shown in FIG. 6 as a thick solid line. A set of the maximum processed detection signal vs target depth curves may be stored or calculated in the detector for different detection channels, different targets of interest, different coils, different filters and different swing speeds of the detector coil.

The detection threshold of a detection channel may be taken as either the user's setting value or a statistical quantity, e.g. $3\sigma$, of the simulated noise or the measured noise of the detection channel over a certain period when there is no target present. One example of the detection threshold is plotted in FIG. 6 as a thin dashed line. The effective detection depth for the target of interest is obtained when the detection threshold equals the maximum processed detection signal, as illustrated in FIG. 6.

Different detection channels with different demodulation functions or different timings have different target sensitivity. Targets with different sizes and different materials couple differently to the TX and RX coils. Different coils have different target sensitivity profile along the depth direction. Different analog and/or digital filters have different target response properties, depending on the swing speeds of the coil, the geometry of the coil and the target depth, etc. The mentioned factors affecting the target sensitivity affects the noise level as well. For example, a detection channel with higher target sensitivity could have higher noise level. By estimating the effective detection depth for the target of interest, the user is informed about not only which setting is optimal for finding the targets of interest, but also the proper expectation about how deep he can find the targets of interest for a particular setting.

Figure 7:
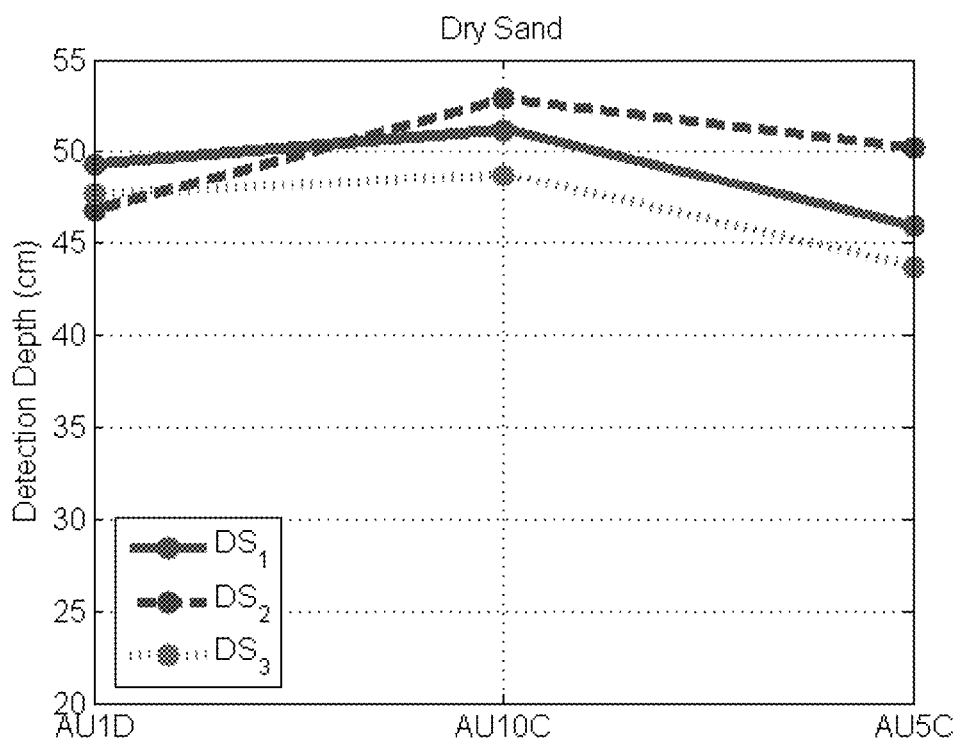
FIGS. 7 and 8 depict the effective detection depths for different targets.
Figure 8:
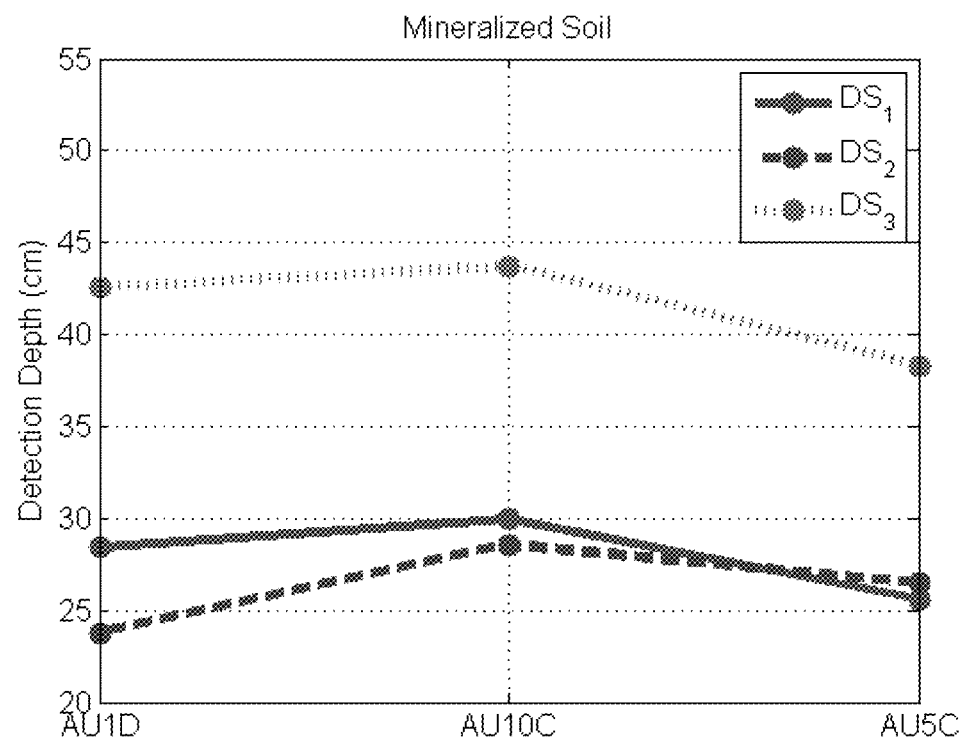

FIGS. 7 and 8 depict the effective detection depths for different targets. The effective detection depths for Australian 1-dollar coins, Australian 10-cent coins and Australian 5-cent coins are plotted when the soil is dry sand or mineralised soil.

For a product with multiple ground balance timings, multiple coils and various other settings, it is usually assumed that the user fully understands the behaviour or characteristics of various timings, coils and other settings and has knowledge about the soil he/she is interrogating, and selects the proper timing, the proper coil and other proper settings. The assumption is incorrect for most users. Displaying the SNR and the effective detection depth in real time for various settings and detection channels makes it easy to correctly operate a metal detector.

Those of skill in the art would understand that information and signals may be represented using any of a variety of technologies and techniques. For example, data, instructions, commands, information, signals, bits, symbols, and chips may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. Software modules, also known as computer programs, computer codes, or instructions, may contain a number of source code or object code segments or instructions, and may reside in any computer readable medium such as a RAM memory, flash memory, ROM memory, EPROM memory, registers, hard disk, a removable disk, a CD-ROM, a DVD-ROM or any other form of computer readable medium. In the alternative, the computer readable medium may be integral to the processor. The processor and the computer readable medium may reside in an ASIC or related device. The software codes may be stored in a memory unit and executed by a processor. The memory unit may be implemented within the processor or external to the processor, in which case it may be communicatively coupled to the processor via various means as is known in the art.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

Further, it should be appreciated that modules and/or other appropriate means for performing the methods and techniques described herein may be downloaded and/or otherwise obtained by computing device. For example, such a device may be coupled to a server to facilitate the transfer of means for performing the methods described herein. Alternatively, various methods described herein may be provided via storage means (e.g., RAM, ROM, a physical storage medium such as a compact disc (CD) or floppy disk, etc.), such that a computing device may obtain the various methods upon coupling or providing the storage means to the device. Moreover, any other suitable technique for providing the methods and techniques described herein to a device may be utilized.

In one form the invention may comprise a computer program product for performing the method or operations presented herein. For example, such a computer program product may comprise a computer (or processor) readable medium having instructions stored (and/or encoded) thereon, the instructions being executable by one or more processors to perform the operations described herein. For certain aspects, the computer program product may include packaging material.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

Please note that the following claims are provisional claims only, and are provided as examples of possible claims and are not intended to limit the scope of what may be claimed in any future patent applications based on the present application. Integers may be added to or omitted from the example claims at a later date so as to further define or re-define the invention.

The invention claimed is:

1. A method for detecting an electrically conductive target in soil using a metal detector including the steps of:
   generating a transmit magnetic field for transmission into the soil based on the transmit signal;
   receiving a receive magnetic field;
   providing a receive signal induced by the receive magnetic field;
   determining, by a processor a noise in the receive signal or a signal to noise ratio of the receive signal; and
   estimating, by the processor, based on the noise in the receive signal, or the signal to noise ratio of the received signal, or user settings, or a combination of at least two thereof, at least one effective detection depth of one or more types of electrically conductive targets in the soil.

2. The method of claim 1, wherein the effective detection depth is estimated when settings of the detector are changed from a first state to a second state by a user, such that an increase of the effective detection depth indicates to a user of the metal detector that the second state is better than the first state, and that a decrease of the effective detection depth indicates to the user of the metal detector that the first state is better than the second state.

3. The method of claim 1, further including the step of selecting one or more types of electrically conductive targets by a user; wherein the estimated effective detection depth is further based on the selected one or more types of electrically conductive targets.

4. The method of claim 1, wherein the at least one effective detection depth includes multiple effective detection depths for a range of targets.

5. A non-transitory computer readable medium including instructions to perform the method of claim 1.

6. A metal detector for detecting an electrically conductive target in soil, including:
   a transmitter for generating a transmit magnetic field for transmission into the soil based on the transmit signal;
   a receiver for receiving a receive magnetic field and for providing a receive signal induced by the receive magnetic field; and
   a processor for determining a noise in the receive signal or a signal to noise ratio of the receive signal; and for estimating, based on the noise in the receive signal, or the signal to noise ratio of the received signal, or user settings, or a combination of at least two thereof, at least one effective detection depth of one or more types of electrically conductive targets in the soil.

7. The metal detector of claim 6, further including a display to present the effective detection depth to the user.

8. The metal detector of claim 6, wherein the effective detection depth is estimated when settings of the detector are changed from a first state to a second state by a user, such that an increase of the effective detection depth indicates to the user of the metal detector that the second state is better than the first state, and that a decrease of the effective detection depth indicates to the user of the metal detector that the first state is better than the second state.

9. The metal detector of claim 6, further including an input for a user to select one or more types of electrically conductive targets; wherein the estimated effective detection depth is further based on the selected one or more types of electrically conductive targets.

10. The metal detection of claim 6, wherein the at least one effective detection depth includes multiple effective detection depths for a range of targets.

* * * * *